United States Patent
Golla et al.

(10) Patent No.: US 7,158,510 B1
(45) Date of Patent: Jan. 2, 2007

(54) LOOK-UP TABLE ARBITRATION SYSTEM AND METHOD FOR A FAST SWITCHING ELEMENT

(75) Inventors: Prasad N. Golla, Plano, TX (US); Gerard Damm, Dallas, TX (US); John Blanton, Dallas, TX (US); Dominique Verchere, Plano, TX (US)

(73) Assignee: Alcatel, Paris (FR)

( * ) Notice: Subject to any disclaimer, the term of this patent is extended or adjusted under 35 U.S.C. 154(b) by 1228 days.

(21) Appl. No.: 10/075,176

(22) Filed: Feb. 14, 2002

(51) Int. Cl.
*H04L 12/54* (2006.01)
(52) U.S. Cl. ...................... 370/374; 370/383
(58) Field of Classification Search ............... 370/374, 370/382, 383, 392, 400, 401, 428, 461
See application file for complete search history.

(56) References Cited

U.S. PATENT DOCUMENTS 6,636,483 B1 * 10/2003 Pannell ...................... 370/236
6,804,241 B1 * 10/2004 Schwartz et al. ........... 370/392

OTHER PUBLICATIONS

TIMA Lab.Research Reports; "Modeling and design of asynchronous priority arbiters for on-chip communication systems"; J.B. Rigaud, J. Quartana, L. Fesquet and M. Renaudin; 7 pages; 2001.

* cited by examiner

*Primary Examiner*—Huy D. Vu
*Assistant Examiner*—Duc Duong
(74) *Attorney, Agent, or Firm*—Danamraj & Youst, PC; Craig A. Hoersten; V. Lawrence Sewell

(57) ABSTRACT

A look-up table (LUT)-based arbitration (LTA) system and methodology for use in a network switch element. Input control signals generated by ingress and egress entities associated with a cross-connect matrix of the network switch element are encoded into address information that is used for interrogating a storage structure. Pre-computed arbitration results based on a select arbiter scheme are stored into fields associated with the storage structure. When a particular input combination is applied with respect to an arbitration iteration, a selected arbitration result is obtained by querying the appropriate field, which is then decoded into a corresponding selected entity for the arbitration iteration.

32 Claims, 9 Drawing Sheets

| ADDRESS INFORMATION 302 || ARBITRATION RESULTS 304 ||
|---|---|---|---|
| INPUTS 306 | STATE INFORMATION 308 | PICK INFORMATION 310 | NEW STATE INFORMATION 312 |
| FIELD$_{(0)}$ | FIELD$_{(0)}$ | FIELD$_{(0)}$ | FIELD$_{(0)}$ |
| FIELD$_{(1)}$ | FIELD$_{(1)}$ | FIELD$_{(1)}$ | FIELD$_{(0)}$ |
| ⋮ | ⋮ | ⋮ | ⋮ |
| FIELD$_{(K)}$ | FIELD$_{(K)}$ | FIELD$_{(K)}$ | FIELD$_{(K)}$ |
| 316 | 318 | 320 | 322 |
| ⋮ | ⋮ | ⋮ | ⋮ |
| FIELD$_{(N-2)}$ | FIELD$_{(N-2)}$ | FIELD$_{(N-2)}$ | FIELD$_{(N-2)}$ |
| FIELD$_{(N-1)}$ | FIELD$_{(N-1)}$ | FIELD$_{(N-1)}$ | FIELD$_{(N-1)}$ |

RRA

| INPUTS | STATE INFO | ADDRESS WIDTH | ROW NUMBER | ROW WIDTH | TABLE SIZE (BITS) | BYTES | KBYTES |
|---|---|---|---|---|---|---|---|
| N | LOG(N) | N+LOG(N) | 2^(ADR WIDTH) | PICK | ROW WIDTH*NUMBER | | |
| 4 | 2 | 2 | 6 | 64 | 2 | 128 | 16 | 0.015625 |
| 8 | 3 | 3 | 11 | 2048 | 3 | 6144 | 768 | 0.75 |
| 16 | 4 | 4 | 20 | 1048576 | 4 | 4194304 | 524288 | 512 |
| 32 | 5 | 5 | 37 | 1.37439E+11 | 5 | 6.87195E+11 | 85899345920 | 83886080 |
| 64 | 6 | 6 | 70 | 1.18059E+21 | 6 | 7.08355E+21 | 8.85444E+20 | 8.64691E+17 |

FIG. 9A

BTA

| INPUTS | STATE INFO | ADDRESS WIDTH | ROW NUMBER | ROW WIDTH | TABLE SIZE (BITS) | BYTES | KBYTES |
|---|---|---|---|---|---|---|---|
| N | N-1 | 2N-1 | 2^(ADR WIDTH) | PICK+FLAGS | ROW WIDTH*NUMBER | | |
| 4 | 3 | 7 | 128 | 7 | 896 | 112 | 0.109375 |
| 8 | 7 | 15 | 32768 | 15 | 491520 | 61440 | 60 |
| 16 | 15 | 31 | 2147483648 | 31 | 66571993088 | 8321499136 | 8126464 |
| 32 | 31 | 63 | 9.22337E+18 | 63 | 5.81072E+20 | 7.26341E+19 | 7.09317E+16 |
| 64 | 63 | 127 | 1.70141E+38 | 127 | 2.16079E+40 | 2.70099E+39 | 2.63769E+36 |

FIG. 9B

| ADDRESS | | RESULT | |
|---|---|---|---|
| INPUT | PTR | PICK | NEW STATE |
| 0000 | 00 | XX | 00 |
| 0000 | 01 | XX | 01 |
| 0000 | 10 | XX | 10 |
| 0000 | 11 | XX | 11 |
| 0001 | 00 | 00 | 01 |
| 0001 | 01 | 00 | 01 |
| 0001 | 10 | 00 | 01 |
| 0001 | 11 | 00 | 01 |
| 0010 | 00 | 01 | 10 |
| 0010 | 01 | 01 | 10 |
| 0010 | 10 | 01 | 10 |
| 0010 | 11 | 01 | 10 |
| 0011 | 00 | 00 | 01 |
| 0011 | 01 | 01 | 10 |
| 0011 | 10 | 00 | 01 |
| 0011 | 11 | 00 | 01 |
| 0100 | 00 | 10 | 11 |
| 0100 | 01 | 10 | 11 |
| 0100 | 10 | 10 | 11 |
| 0100 | 11 | 10 | 11 |
| 0101 | 00 | 00 | 01 |
| 0101 | 01 | 10 | 11 |
| 0101 | 10 | 10 | 11 |
| 0101 | 11 | 00 | 01 |
| 0110 | 00 | 01 | 10 |
| 0110 | 01 | 01 | 10 |
| 0110 | 10 | 10 | 11 |
| 0110 | 11 | 01 | 10 |
| 0111 | 00 | 00 | 01 |
| 0111 | 01 | 01 | 10 |
| 0111 | 10 | 10 | 11 |
| 0111 | 11 | 00 | 01 |
| 1000 | 00 | 11 | 00 |
| 1000 | 01 | 11 | 00 |
| 1000 | 10 | 11 | 00 |
| 1000 | 11 | 11 | 00 |

FIG. 10A

| 1001 | 00 | 00 | 01 |
|---|---|---|---|
| 1001 | 01 | 11 | 00 |
| 1001 | 10 | 11 | 00 |
| 1001 | 11 | 11 | 00 |
| 1010 | 00 | 01 | 10 |
| 1010 | 01 | 01 | 10 |
| 1010 | 10 | 11 | 00 |
| 1010 | 11 | 11 | 00 |
| 1011 | 00 | 00 | 01 |
| 1011 | 01 | 01 | 10 |
| 1011 | 10 | 11 | 00 |
| 1011 | 11 | 11 | 00 |
| 1100 | 00 | 10 | 11 |
| 1100 | 01 | 10 | 11 |
| 1100 | 10 | 10 | 11 |
| 1100 | 11 | 11 | 00 |
| 1101 | 00 | 00 | 01 |
| 1101 | 01 | 10 | 11 |
| 1101 | 10 | 10 | 11 |
| 1101 | 11 | 11 | 00 |
| 1110 | 00 | 01 | 10 |
| 1110 | 01 | 01 | 10 |
| 1110 | 10 | 10 | 11 |
| 1110 | 11 | 11 | 00 |
| 1111 | 00 | 00 | 01 |
| 1111 | 01 | 01 | 10 |
| 1111 | 10 | 10 | 11 |
| 1111 | 11 | 11 | 00 |

| ADDRESS | | RESULT | |
|---|---|---|---|
| INPUT | STATE | PICK | NEW STATE |
| 0000 | 000 | XX | 000 |
| 0000 | 001 | XX | 001 |
| 0000 | 010 | XX | 010 |
| 0000 | 011 | XX | 011 |
| 0000 | 100 | XX | 100 |
| 0000 | 101 | XX | 101 |
| 0000 | 110 | XX | 110 |
| 0000 | 111 | XX | 111 |
| 0001 | 000 | 00 | 000 |
| 0001 | 001 | 00 | 000 |
| 0001 | 010 | 00 | 010 |
| 0001 | 011 | 00 | 010 |
| 0001 | 100 | 00 | 000 |
| 0001 | 101 | 00 | 000 |
| 0001 | 110 | 00 | 010 |
| 0001 | 111 | 00 | 010 |
| 0010 | 000 | 01 | 001 |
| 0010 | 001 | 01 | 001 |
| 0010 | 010 | 01 | 011 |
| 0010 | 011 | 01 | 011 |
| 0010 | 100 | 01 | 001 |
| 0010 | 101 | 01 | 001 |
| 0010 | 110 | 01 | 011 |
| 0010 | 111 | 01 | 011 |
| 0011 | 000 | 01 | 001 |
| 0011 | 001 | 00 | 000 |
| 0011 | 010 | 01 | 011 |
| 0011 | 011 | 00 | 010 |
| 0011 | 100 | 01 | 001 |
| 0011 | 101 | 00 | 000 |
| 0011 | 110 | 01 | 011 |
| 0011 | 111 | 00 | 010 |
| 0100 | 000 | 10 | 100 |
| 0100 | 001 | 10 | 101 |
| 0100 | 010 | 10 | 100 |
| 0100 | 011 | 10 | 101 |
| 0100 | 100 | 10 | 100 |
| 0100 | 101 | 10 | 101 |
| 0100 | 110 | 10 | 100 |
| 0100 | 111 | 10 | 101 |
| 0101 | 000 | 10 | 100 |

FIG. 11B

| INPUT | STATE | PICK | NEW STATE |
|---|---|---|---|
| 0101 | 001 | 10 | 101 |
| 0101 | 010 | 10 | 100 |
| 0101 | 011 | 10 | 101 |
| 0101 | 100 | 00 | 000 |
| 0101 | 101 | 00 | 000 |
| 0101 | 110 | 00 | 010 |
| 0101 | 111 | 00 | 010 |
| 0110 | 000 | 10 | 100 |
| 0110 | 001 | 10 | 101 |
| 0110 | 010 | 10 | 100 |
| 0110 | 011 | 10 | 101 |
| 0110 | 100 | 01 | 001 |
| 0110 | 101 | 01 | 001 |
| 0110 | 110 | 01 | 011 |
| 0110 | 111 | 01 | 011 |
| 0111 | 000 | 10 | 100 |
| 0111 | 001 | 10 | 101 |
| 0111 | 010 | 10 | 100 |
| 0111 | 011 | 10 | 101 |
| 0111 | 100 | 01 | 001 |
| 0111 | 101 | 00 | 000 |
| 0111 | 110 | 01 | 011 |
| 0111 | 111 | 00 | 010 |
| 1000 | 000 | 11 | 110 |
| 1000 | 001 | 11 | 111 |
| 1000 | 010 | 11 | 110 |
| 1000 | 011 | 11 | 111 |
| 1000 | 100 | 11 | 110 |
| 1000 | 101 | 11 | 111 |
| 1000 | 110 | 11 | 110 |
| 1000 | 111 | 11 | 111 |
| 1001 | 000 | 11 | 110 |
| 1001 | 001 | 11 | 111 |
| 1001 | 010 | 11 | 110 |
| 1001 | 011 | 11 | 111 |
| 1001 | 100 | 00 | 000 |
| 1001 | 101 | 00 | 000 |
| 1001 | 110 | 00 | 110 |
| 1001 | 111 | 00 | 110 |
| 1010 | 000 | 11 | 110 |
| 1010 | 001 | 11 | 111 |
| 1010 | 010 | 11 | 110 |
| 1010 | 011 | 11 | 111 |
| 1010 | 100 | 01 | 001 |

| | | | |
|---|---|---|---|
| 1010 | 101 | 01 | 001 |
| 1010 | 110 | 01 | 011 |
| 1010 | 111 | 01 | 011 |
| 1011 | 000 | 11 | 110 |
| 1011 | 001 | 11 | 111 |
| 1011 | 010 | 11 | 110 |
| 1011 | 011 | 11 | 111 |
| 1011 | 100 | 01 | 001 |
| 1011 | 101 | 00 | 000 |
| 1011 | 110 | 01 | 011 |
| 1011 | 111 | 00 | 010 |
| 1100 | 000 | 11 | 110 |
| 1100 | 001 | 11 | 111 |
| 1100 | 010 | 10 | 100 |
| 1100 | 011 | 10 | 101 |
| 1100 | 100 | 11 | 110 |
| 1100 | 101 | 11 | 111 |
| 1100 | 110 | 10 | 100 |
| 1100 | 111 | 10 | 101 |
| 1101 | 000 | 11 | 110 |
| 1101 | 001 | 11 | 111 |
| 1101 | 010 | 10 | 100 |
| 1101 | 011 | 10 | 101 |
| 1101 | 100 | 00 | 000 |
| 1101 | 101 | 00 | 000 |
| 1101 | 110 | 00 | 010 |
| 1101 | 111 | 00 | 010 |
| 1110 | 000 | 11 | 110 |
| 1110 | 001 | 11 | 111 |
| 1110 | 010 | 10 | 100 |
| 1110 | 011 | 10 | 101 |
| 1110 | 100 | 01 | 001 |
| 1110 | 101 | 01 | 001 |
| 1110 | 110 | 01 | 011 |
| 1110 | 111 | 01 | 011 |
| 1111 | 000 | 11 | 110 |
| 1111 | 001 | 11 | 111 |
| 1111 | 010 | 10 | 100 |
| 1111 | 011 | 10 | 101 |
| 1111 | 100 | 01 | 001 |
| 1111 | 101 | 00 | 000 |
| 1111 | 110 | 01 | 011 |
| 1111 | 111 | 00 | 010 |

FIG. 11C

| ADDRESS INPUT | RESULT PICK |
|---|---|
| 0000 | XX |
| 0001 | 00 |
| 0010 | 01 |
| 0011 | 00 |
| 0100 | 10 |
| 0101 | 00 |
| 0110 | 01 |
| 0111 | 00 |
| 1000 | 11 |
| 1001 | 00 |
| 1010 | 01 |
| 1011 | 00 |
| 1100 | 10 |
| 1101 | 00 |
| 1110 | 01 |
| 1111 | 00 |

FIG. 12

LOOK-UP TABLE ARBITRATION SYSTEM AND METHOD FOR A FAST SWITCHING ELEMENT

CROSS-REFERENCE TO RELATED APPLICATION(S)

This application discloses subject matter related to the subject matter disclosed in the following commonly owned co-pending patent application(s): (i) "Multiserver Scheduling System And Method For A Fast Switching Element," application Ser. No. 10/059,641, filed Jan. 28, 2002, in the names of: Prasad Golla, Gerard Damm, John Blanton, Mei Yang, Dominique Verchere, Hakki Candan Cankaya, and Yijun Xiong, which is (are) hereby incorporated by reference for all purposes.

BACKGROUND OF THE INVENTION

1. Technical Field of the Invention

The present invention generally relates to switching systems used in communications networks. More particularly, and not by way of any limitation, the present invention is directed to a look-up table (LUT)-based arbitration (LTA) system and method for use in a network switch element.

2. Description of Related Art

Network communications technology is rapidly advancing in a direction in which the transmission speeds will continue to supersede the switching speeds. Accordingly, switching systems of the future will require the ability to accommodate data transfer rates in excess of 100 times what has been common until recently. For example, a switching system to be used in the core network (e.g., a core router) may have up to 512 input channels and 512 output channels, each with a data transmission rate of several gigabits per second. The ability to switch such high-speed traffic requires the use of advanced scheduling systems in conjunction with fast switching fabrics having very short time slots. Furthermore, it is expected that these concerns will become particularly acute in the deployment of the Next Generation Network (NGN) infrastructure where Quality of Service (QoS) will also be of critical importance.

Numerous approaches to implementing fast scheduling algorithms currently exist. As is well-known, these scheduling algorithms generally require the use of arbitration as a resolution mechanism among a plurality of units (e.g., servers associated with input and output ports of a network element) contending for a common resource, i.e., the bandwidth of a switching fabric, which units must establish appropriate traffic paths before data can be transported across the fabric. Since arbitration times can take a significant portion of a scheduling process, it is highly desirable to implement a faster arbitration scheme where massive throughput rates are required.

Known solutions for supporting fast arbitrations (i.e., where arbitration iterations can be executed in a few clock cycles) involve arbiters whose structure and logic are implemented in hardware. Such hardware implementations of round-robin arbiters (RRAS) and binary tree arbiters (BTAs) are exemplary. Whereas these solutions are generally adequate with respect to the state-of-the-art switching system architectures, certain deficiencies and shortcomings persist. First, the existing hardware arbiters are generally comprised of complex logic, requiring a rather large gate count and expensive implementation. Thus, their price/ performance ratios are not entirely satisfactory. Further, although current hardware arbiters are typically faster than their software counterparts, their performance is still not acceptable for supporting the next-level switching performance.

SUMMARY OF THE INVENTION

Accordingly, the present invention advantageously provides an innovative, storage-based arbitration system and methodology for use in a network switch element, wherein an arbitration scheme to be implemented for use with a scheduler is simulated by means of a look-up table (LUT) that is populated with pre-computed arbitration results for quicker access. Input control signals generated by ingress and egress entities associated with a cross-connect matrix of the network switch element are encoded into address information that is used for interrogating the LUT storage structure. When a particular input combination is applied with respect to an arbitration iteration, a selected arbitration result is obtained by querying the appropriate field, which is then decoded into a corresponding selected entity (i.e., arbitration pick) for the arbitration iteration.

In one aspect, the present invention is directed to an arbitration system for a network switch element. An encoder is provided for encoding a plurality of inputs into address information associated with a storage structure, wherein the inputs correspond to arbitration control signals generated by a plurality of entities associated with a cross-connect matrix of the network switch element. The entities are operable to establish a set of connections through the cross-connect matrix for transporting data from the network switch element's ingress side to its egress side. The storage structure includes a plurality of fields for storing pre-computed arbitration results based on a select arbiter scheme employed in a particular scheduling mechanism for transporting the data in the switch element. A decoder is included for decoding a selected arbitration result based on a particular input combination into an identity associated with a corresponding entity.

In another aspect, the present invention is directed to an arbitration methodology for a network switch element. A plurality of inputs are encoded into address information associated with a storage structure, wherein the inputs correspond to control signals generated by a plurality of entities associated with a cross-connect matrix of the network switch element. As pointed out earlier, the entities are operable to establish a set of connections through the cross-connect matrix for transporting data from the network switch element's ingress side to its egress side. Arbitration results based on a select arbiter scheme to be employed in a particular scheduling mechanism for transporting the data are pre-computed and stored in a plurality of fields associated with the storage structure for quicker access. Each arbitration result preferably corresponds to a particular input combination, which in some instances can include arbiter state information. Responsive to a particular input combination in an arbitration iteration, a selected arbitration result corresponding thereto is obtained from the storage structure by way of a memory access operation. The selected arbitration result is appropriately decoded into an identity associated with a corresponding selected entity for the arbitration iteration. Since memory access operations are inherently faster than executing complex combinatorial logic, quicker arbitrations are accordingly achieved.

BRIEF DESCRIPTION OF THE DRAWINGS

A more complete understanding of the present invention may be had by reference to the following Detailed Description when taken in conjunction with the accompanying drawings wherein:

FIGS. 9A and 9B are two tables illustrating the various storage parameters associated with LUT-based RRA and BTA implementations for a select number of inputs;

FIGS. 10A and 10B depict an exemplary LUT for a 4-input RRA rendition in accordance with the teachings of the present invention;

FIGS. 11A–11C depict an exemplary LUT for a 4-input BTA rendition in accordance with the teachings of the present invention; and FIG. 12 is an exemplary LUT for a 4-input fixed priority arbiter rendered in accordance with the teachings of the present invention.

DETAILED DESCRIPTION OF THE DRAWINGS

Figure 1:
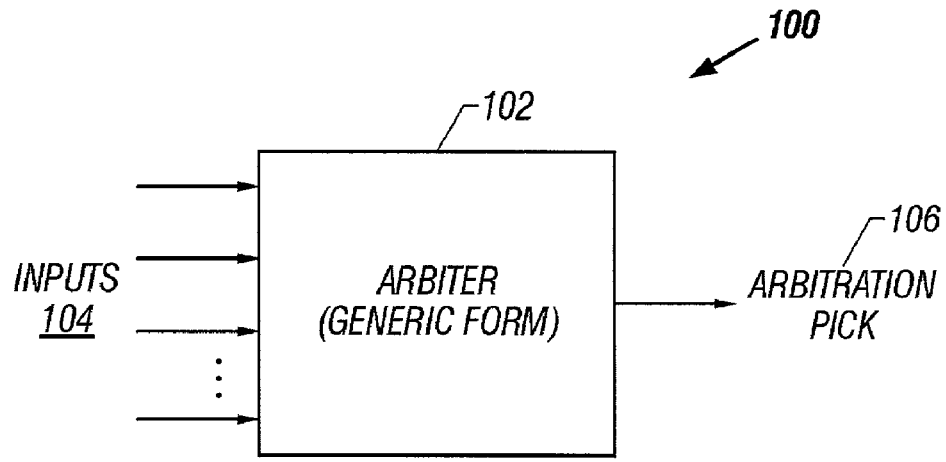
FIG. 1 depicts a high-level conceptual scheme of an exemplary generic arbiter for purposes of the present invention.

In the drawings, like or similar elements are designated with identical reference numerals throughout the several views thereof, and the various elements depicted are not necessarily drawn to scale. Referring now to FIG. 1, depicted therein is a high-level conceptual scheme of an exemplary generic arbiter system 100 for purposes of the present invention. It is envisaged that any arbitration scheme to be employed as a resolution mechanism among a plurality of units contending for a common resource can be emulated using pre-computed arbitration results that are stored in an appropriate storage structure in accordance with the teachings herein. Out of the plural contending units, preferably one unit may be picked or selected based on a predefined strategy. Such arbitration results may be computed in accordance with any known or heretofore unknown arbiter scheme, which results are used to populate the storage structure provided therefor. Reference numeral 102 refers to a generic arbiter whose arbitration results are captured in a storage element such as, e.g., a look-up table (LUT). Control signals generated by the contending units are treated as inputs 104 which can be encoded as address information used for interrogating the LUT arbiter. For any particular combination of inputs, a corresponding location of the LUT holds a unique arbitration result ("data"), which can be decoded as a specific unit's identity that is to be chosen as the arbitration's "pick" 106.

Figure 2:
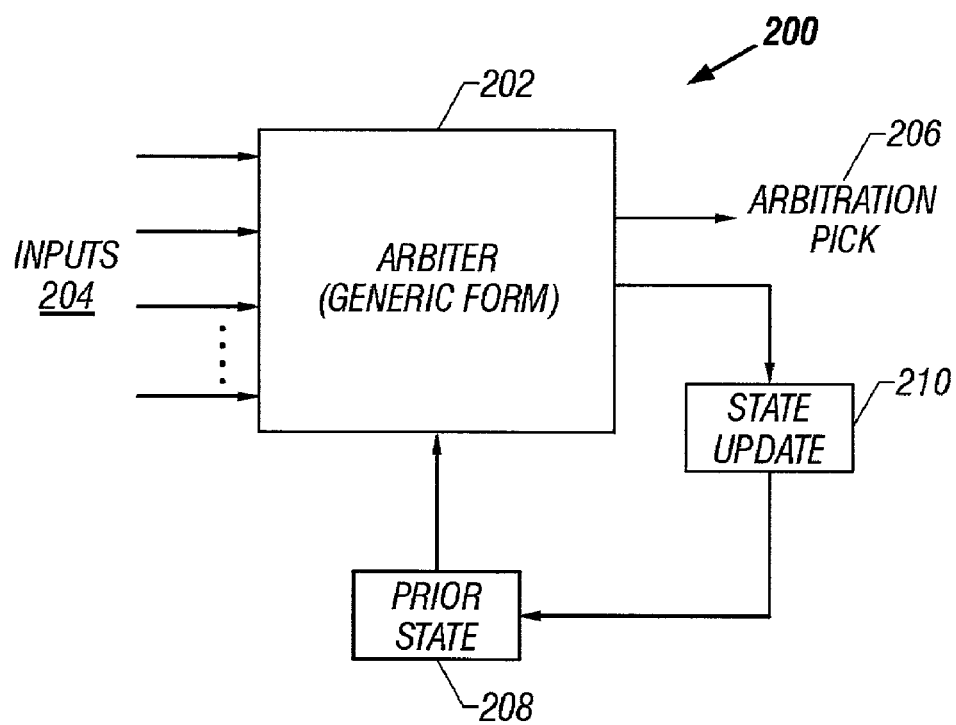
FIG. 2 depicts a high-level conceptual scheme of another exemplary generic arbiter for purposes of the present invention.

FIG. 2 depicts a high-level conceptual scheme of another exemplary generic arbiter system 200 for purposes of the present invention. Essentially, the arbiter system 200 is a conceptual representation that is similar to the arbiter representation 100 described above, except that state information is also included in the system 200 with respect to a selected arbiter 202 for purposes of determining appropriate arbitration results. Accordingly, a storage structure associated with the arbitration system 200 is operable to store prior state information 208 (which, as will be explained in additional detail below, can include pointer information, flag information, etc. associated with the particular arbiter scheme being emulated), in addition to the pre-computed arbitration results stored in a suitable storage structure (e.g., a LUT) that captures the selected arbitration scheme. Furthermore, as part of the selected arbitration scheme, the state information can be updated by way of a predefined state update process 210.

Again, control signals generated by the contending units are treated as inputs 204 which can be encoded as address information used for interrogating the LUT arbiter. The state information is also encoded as part of the address information that is used for interrogating the LUT. Similar to the state-independent arbiter system 100 of FIG. 1, for any particular combination of inputs and state (collectively, the address information), a corresponding location of the LUT holds a unique arbitration result ("data"), which can be decoded as a specific unit's identity that is to be chosen as the arbitration's "pick" 206.

In one exemplary implementation, the prior state information may be stored in one or more registers, whereas the LUT-based state-dependent arbitration results may be provided in a separate memory structure. In another exemplary implementation, a single storage structure may be provided for storing both the state information as well as the arbitration results. Further, regardless whether a state-dependent or state-independent arbitration scheme is implemented, the associated storage structure may be realized as a suitable high-speed data retrieval device such as, e.g., an integrated circuit (IC) device selected from the group comprising a read-only memory (ROM) structure, an electrically programmable read-only memory (EPROM) structure, a dynamic random access memory (DRAM) structure, a static random access memory (SRAM) structure, a Flash memory structure, a field-programmable gate array (FPGA), an application-specific integrated circuit (ASIC), et cetera.

Figures 3, 4:
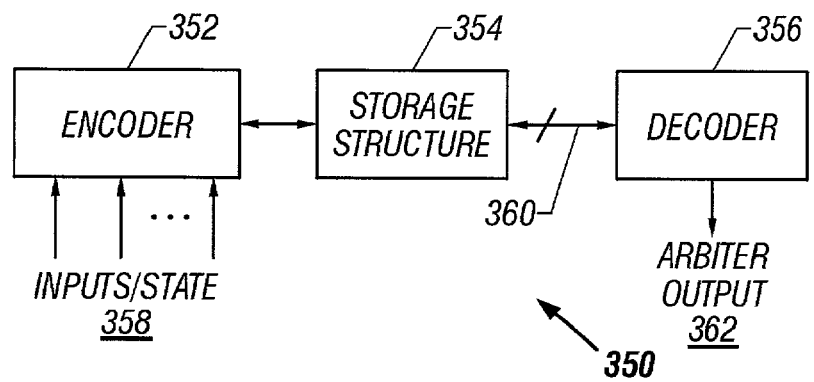
FIG. 3 depicts an exemplary look-up table (LUT) for emulating a select arbitration scheme in accordance with the teachings of the present invention.
FIG. 4 depicts a high-level functional block diagram of a LUT-based arbitration system of the present invention.

FIG. 3 depicts an exemplary LUT 300 for emulating a select arbitration scheme in accordance with the teachings of the present invention. Various inputs 306 and state information 308 (where applicable) are encoded as address information 302. Pre-computed pick information 310 and new state information 312 are provided as part of encoded arbitration result data 304. Depending on the number of inputs and the state information that need to be encoded in binary form, a plurality of fields (FIELD[0] through FIELD[N-1]) are provided as N rows (reference numerals 314-0 through 314-(N-1)) for inputs 306, state information 308, pick information 310 and new state information 312. When a particular combination of inputs and state information are available for a specific arbitration iteration in accordance with the selected arbiter scheme, a corresponding row, for instance, row 314-K, is queried. As part of the address information 302, FIELD[K] 316 and FIELD[K] 318 contain appropriately-encoded input information and state information. Corresponding to these "address" fields, "data" fields, i.e., FIELD[K] 320 and FIELD 322, contain the identity of the picked entity and the updated state information, respectively, again in a suitable encoded form. Depending on the particular application of the arbitration scheme (e.g., for effectuating a scheduling algorithm in a network switching element, which application will be discussed in greater detail hereinbelow), the data fields are decoded or demultiplexed appropriately for their intended use.

Based on the foregoing discussion, a generic LUT-based arbiter (LTA) system may now be described. Referring to FIG. 4, depicted therein is a high-level functional block diagram of an LTA system 350 of the present invention that is operable to emulate any known or heretofore unknown arbiter scheme. An encoder 352 is provided for encoding a plurality of inputs 358 (and state information, if applicable) into address information associated with a storage element 354. As alluded to before, the storage element 354 may be implemented using any high speed IC device, preferably a device where the number of cycles required for data access is within a predetermined range that is advantageous for purposes of the application in which arbitration is being used. A decoder 356 is provided for decoding a selected arbitration result, which is obtained via path 360 by querying the storage structure based on a particular combination of the inputs, into an identity of a corresponding entity selected from the plurality of contending units. The decoded arbitration results may be provided as arbiter output(s) 362, which can include the arbiter pick as well as any updated state information.

Figure 5:
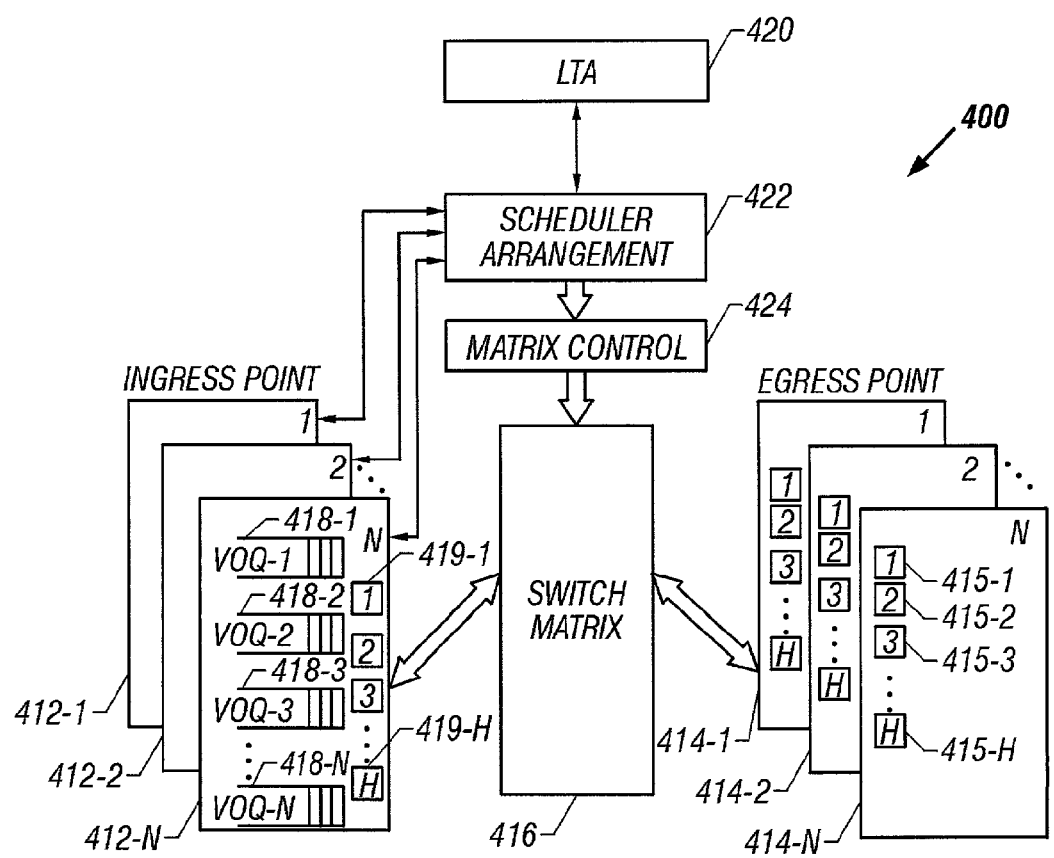
FIG. 5 depicts a functional block diagram of an exemplary network switch element wherein the teachings of present invention may be advantageously employed.

FIG. 5 depicts a functional block diagram of an exemplary network switch element 400 wherein the teachings of present invention may be advantageously employed. As pointed out in the Background section of the present patent application, a number of arbitration techniques are available for effectuating a suitable algorithm with respect to scheduling traffic within a switching node. Even where such techniques are implemented in arbiter-specific hardware in order to gain higher throughput, a significantly more advantageous implementation can be achieved by emulating any particular arbiter scheme via the LUT-based realization of the present invention.

The exemplary network switch element 400 may be conceptualized as having an "ingress side" with a plurality of ingress points (reference numerals 412-1 through 412-N) and an "egress side" with a plurality of egress points (reference numerals 414-1 through 414-N). A suitable switch matrix 416 is disposed as a cross-connect fabric (XCF) between the ingress and egress points for facilitating the traffic therebetween. The switch matrix 416 may be embodied as a crossbar or switched backplane that is realized in a pure optical, electrical, or an electro-optical domain. When implemented in an optical domain, the switch matrix may be referred to as the optical matrix (OM).

As those skilled in the art should appreciate, the various input and output ports of the switch element 400 may be supported by a number of line cards, depending on the specific implementational objectives. Additionally, the line cards may be further concentrated into what may be referred to as "burst cards" in some embodiments. Accordingly, for purposes of the present patent application, the ingress and egress points depicted in FIG. 5 are illustrative of ports, line cards, burst cards, and the like, and should be conceptualized as entities that are connected to the switch matrix for injecting traffic into it or for receiving traffic from it. For the sake of convenience and organizational simplicity, however, the ingress and egress points will be treated as ingress and egress ports, respectively.

Each ingress point is preferably provided with a plurality of virtual output queues (VOQs) in order to overcome the well known "head-of-line" (HOL) blocking problem encountered in any high-speed switching/routing element. Essentially, each VOQ of an ingress point is operable to contain incoming traffic that is to be routed to a particular corresponding destination across the switch matrix, i.e., the corresponding egress point. Accordingly, it should be understood that after a forwarding decision has been made, the incoming traffic units (e.g., cells, packets, protocol data units or PDUs, etc.) are segregated into VOQ buffers corresponding to the egress ports they are destined to.

In the exemplary network switch element 400, each ingress port is operable to support N VOQs, as there are N egress ports coupled to the XCF. Reference numerals 418-1 through 418-N exemplify N VOQs supported by the ingress ports. In addition, each ingress and egress port is provided with a plurality of servers, which are entities operable to put traffic into the XCF or to extract traffic from it for downstream transmission. Reference numerals 419-1 through 419-H exemplify the plural servers supported by each ingress port and hence may be referred to as ingress servers. In similar fashion, reference numerals 415-1 through 415-H exemplify the egress servers supported by each egress port.

In accordance with the teachings of the present invention, a LUT-based arbiter arrangement 420 which interacts with a generalized scheduling arrangement 422 is provided for configuring the XCF at each time slot associated therewith (also referred to as a matrix cycle) so as to transmit one or more transmission units from the ingress side to the egress side of the network element 400. As will be described in greater detail hereinbelow, the essential purpose of the LTA 420 and generalized scheduler 422 arrangement is to compute, at each time slot, a matching between the VOQs and the servers such that certain performance properties (e.g., fairness, starvation, server use, low implementation cost, etc.) are optimized as much as possible. At each time slot, the generalized scheduler 422 generates control input to a matrix control unit 424 based on the input information exchanged between the scheduler and the ingress ports, which information is utilized in the arbitration process effectuated by means of LTA 420. Thereafter, the matrix controller 424 utilizes the control input for configuring the transmission paths through the XCF. It will be further shown that the generalized LTA arrangement of the present invention is extremely versatile in implementation, in that any type of arbitration schemes and methodologies may be realized depending on the ingress/egress server architecture, arbiter architecture and, where iterative scheduling is implemented, the particular arbitration iteration strategy used. To better understand the generalized LTA implementation of the present invention in the context of the traffic scheduling problem in a network switch element, a brief description thereof is provided immediately hereinbelow.

It is well known that the traffic scheduling problem falls into a class of optimization problems identified as "maximum/maximal bipartite matching problems" (MBMP) where optimal/optimum matching is to be achieved between two sets of entities which, for our purposes, can be a plurality of input nodes and a plurality of output nodes. There are two kinds of matches for a bipartite graph. A "maximum" match is one that pairs the maximum number of inputs and outputs together, i.e., there is no other pairing that will result in more input/output pairs. A "maximal" match is one for which pairings cannot be trivially added, i.e., each node is either matched or has no edge to an unmatched node. Algorithmic solutions to the MBMP problem typically involve arbitration between inputs and outputs. Also, it is generally preferred that algorithmic solutions to the MBMP problem be iterative because: (i) the arbitration times are smaller; and (ii) simpler hardware implementations are possible—which in turn can be realized in a LUT.

As iterative solutions, it is further preferred that the algorithms rapidly converge to an optimal or near-optimal solution, with less control data exchange between the input/ingress arbiters and output/egress arbiters. Accordingly, since a LUT-based arbitration mechanism reduces the magnitude of control data to be exchanged (because the pre-computed arbitration results are available in a storage element), scheduler processing times can be significant reduced.

As is well known, an iterative algorithm exchanges control signal information such as Requests, Grants and Accepts between the ingress and egress arbiters. Requests are formed at the ingress points based on the transmission units in each VOQ. The requests are either first filtered by the ingress arbiters (which may also be referred to as request arbiters) or sent directly to the egress arbiters (also referred to as grant arbiters) for arbitration. Each egress (grant) arbiter receives requests from the ingress (request) arbiters and arbitrates using a suitable arbitration scheme (e.g., a round robin arbitration (RRA) scheme, a binary tree arbitration (BTA) scheme (also known as the Ping Pong (PP) arbitration), or a fixed priority arbitration scheme, et cetera) to resolve the grants to be sent to the ingress arbiters. The grants are either accepted implicitly or resolved by another set of ingress arbiters (accept arbiters). The accepts are then sent to the egress arbiters.

Thus, it can be seen that there are two arbitration iteration strategies that may be implemented in an iterative scheduling arrangement, namely, the Requests-Grants (RG) strategy and the Requests-Grants-Accepts (RGA) strategy, between the ingress points and egress points of an exemplary network switch element (e.g., network switch element 400 shown in FIG. 5). For purposes of the present invention, the ingress points collectively exemplify the input side entities such as VOQs, ingress ports, ingress line cards, ingress arbiters, and the like. Similarly, the egress entities collectively exemplify the output side entities such as egress ports, egress line cards, egress arbiters, etc. In the Request phase, an ingress node is operable to make up to a certain number of requests (for example, N) corresponding to the number of egress entities. Each of the N egress entities grants, based on a predetermined arbitration scheme, up to H requests (mathematically, up to MAX {H; Number of available servers}) out of all the requests it has received. Thereafter, in the Accept phase, each of the N ingress entities accepts up to H (or, MAX {H, available servers}) of the grants it has received from the subset of the egress entities to which it sent requests previously, based on the arbitration scheme employed.

It should be apparent that in the iterative RG strategy accepts are implicit at the ingress side since a grant is always accepted. In order to avoid the Accept phase, the requests from the VOQs are first sent to the ingress arbiters which resolve one request per available server. That is, the ingress ports limit themselves to H requests in total (or fewer, depending on the current matching status). Thus, an arbitration of the initial requests is performed by the ingress arbiters and the filtered requests are in turn sent to the egress arbiters. Upon applying a suitable arbitration method at the egress side, the egress arbiters issue one grant per available server. The grants are implicitly accepted at the ingress side and the number of available servers at each egress port is updated for the next iteration.

In the iterative RGA strategy, the Request phase involves building an Intermediate Request matrix by taking into account the initial requests and the current matching status. The requests cannot exceed H for each destination (or fewer, depending on the number of unmatched servers available in the current iteration) This is simply a maximum limit mechanism rather than an arbitration. Thus, all the requests from the VOQs are directly sent to the egress arbiters which arbitrate according to the available servers at the egress side in order to issue grants. The grants per egress point cannot exceed H for each requesting ingress point, and are sent to the ingress arbiters which arbitrate and select one grant (i.e., accept) according to the available servers at the ingress side. In the next iteration, the unmatched VOQs again make requests to the output arbiters to start the cycle all over again.

Those skilled in the art should appreciate that the RG strategy is better than the RGA strategy where the amount of control data exchanged between the ingress and egress arbiters may be of concern, particularly if the arbiters reside on separate chips or cards. For an N×N switch, RGA makes $O\{N^2\}$ requests while the requests in RG are limited to only $O\{N\}$. Since there are N VOQs per each ingress point, $N^2$ requests are made in RGA. On the other hand, since one request per each server per ingress point is made in RG (i.e., a total of HN for the input side), the amount of control traffic exchanged is much lower.

As alluded to hereinabove, the arbitration schemes at the ingress side, egress side, or both, may be effectuated by ring-based arbitrators (e.g., RRA), tree-based arbitrators (e.g., BTA), or other arbiter types. Moreover, a large number of scheduler mechanisms may be implemented by varying several aspects such as, e.g., ingress arbiter architecture, egress arbiter architecture, and the arbitration iteration strategy, etc. As described in the foregoing discussion, the arbiter architecture involves type of arbiters (RRA, BTA, fixed priority, circular queues, etc.), number of arbiters (one per ingress port (i.e., single arbiter) or one per server (i.e., multi-arbiter)), and the like. Additional aspects of the arbiter management also play a role in further refining the scheduling algorithm species that can be utilized in conjunction with the generalized LTA of the present invention. Finally, the arbitration iteration strategies involve the RGA and RG strategies which have been explained hereinabove, as well as other considerations such as arbiter status update schemes (for example, updating the egress arbiters only after the first iteration), priority management, and the like. The various scheduling mechanisms that can be obtained by using numerous particular combinations of the above factors are described in greater detail in the following commonly owned co-pending patent application entitled "Multiserver Scheduling System And Method For A Fast Switching Element," application Ser. No. 10/059,641, filed Jan. 28, 2002, in the names of: Prasad Golla, Gerard Damm, John Blanton, Mei Yang, Dominique Verchere, Hakki Candan Cankaya, and Yijun Xiong, which is hereby incorporated by reference for all purposes.

Figure 6:
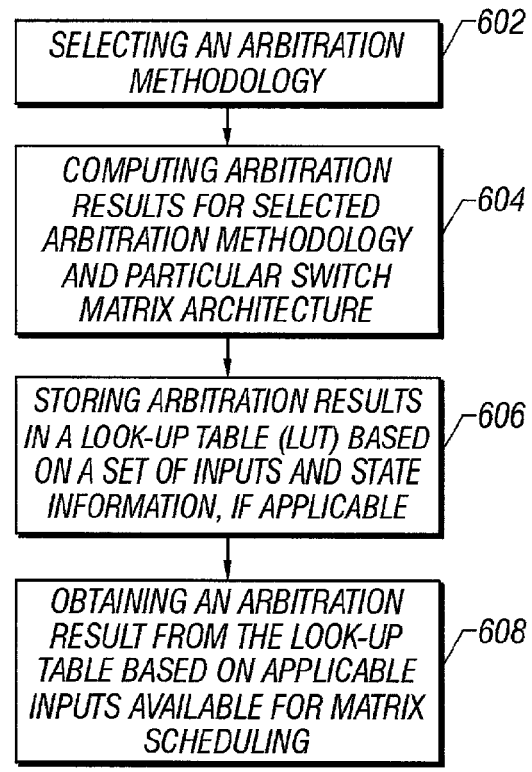
FIG. 6 is a flow chart of the various steps involved in an LUT-based arbitration methodology of the present invention.

Referring now to FIG. 6, shown therein is a flow chart of the various steps involved in a LUT-based arbitration methodology of the present invention. First, a particular arbitration scheme, which may be dictated in part by the matrix scheduler mechanism to be implemented as discussed above, is selected for LUT-based implementation (step 602).

The various entities operable to send arbitration control signals and associated state information, if applicable, of a particular exemplary switch matrix are abstracted as "inputs" that are encoded into a set of addresses. Arbitration results are then computed based on the arbiter's operation and how it is to be architected in the particular exemplary network switch element (step 604). The arbitration results are stored in a LUT storage structure based on the address information (step 606), as described hereinabove with respect to the exemplary LUT embodiment depicted in FIG. 3. When a particular input combination is provided for arbitration in any iteration phase in order to effectuate matrix scheduling (as ingress arbiter(s), egress arbiter(s), or in any arbiter combination deployed on the ingress/egress sides of the network element), the input combination (including the status information, if any) is used to query the LUT to obtain the pre-computed arbitration result (step 608). Due to the inherent cycle time advantage in memory access operations, arbitration times are accordingly reduced, thereby facilitating faster scheduling across the switch matrix of the network element.

Figure 7:
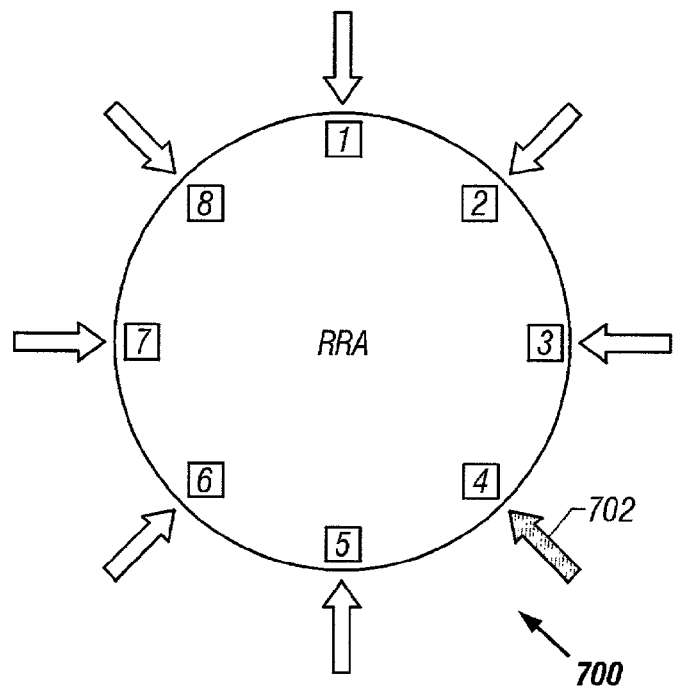
FIG. 7 depicts an exemplary 8-input round robin arbiter (RRA) that can be implemented as a LUT-based arbiter (LTA) in accordance with the teachings of the present invention.

FIG. 7 depicts an exemplary 8-input round robin arbiter (RRA) 700 that can be implemented as a LUT-based arbiter (LTA) in accordance with the teachings of the present invention. The RRA 700 is a sequential circular list of all port or card identification numbers (e.g., eight such entities are exemplified herein), with a persistent pointer 702 that steps through the list in a round robin fashion to ensure fairness. The inputs are encoded identities of the entities which generate control signals that are appropriate to the iteration phase. The state information comprises the pointer location. Usually, an arbitration iteration picks the next available entity having a non-zero input (e.g., a request) in a sequential manner, starting at the current pointer. In the 8-input RRA 700 exemplified herein, the pointer 702 points to the fourth entity. When this arbiter is used the next time, the arbitration results of the LUT must yield the identity of this fourth entity (i.e., it will be the arbitration pick) if it has a current control signal. If the fourth entity does not have a control signal (i.e., its encoded input is zero), then the next entity with the non-zero input will be picked. If there are none, then no entity will be picked and the pointer stays at the same position. Additional details of the LUT-based RRA will be set forth hereinbelow in particular reference to an exemplary LUT provided for a 4-input arbiter.

Figure 8:
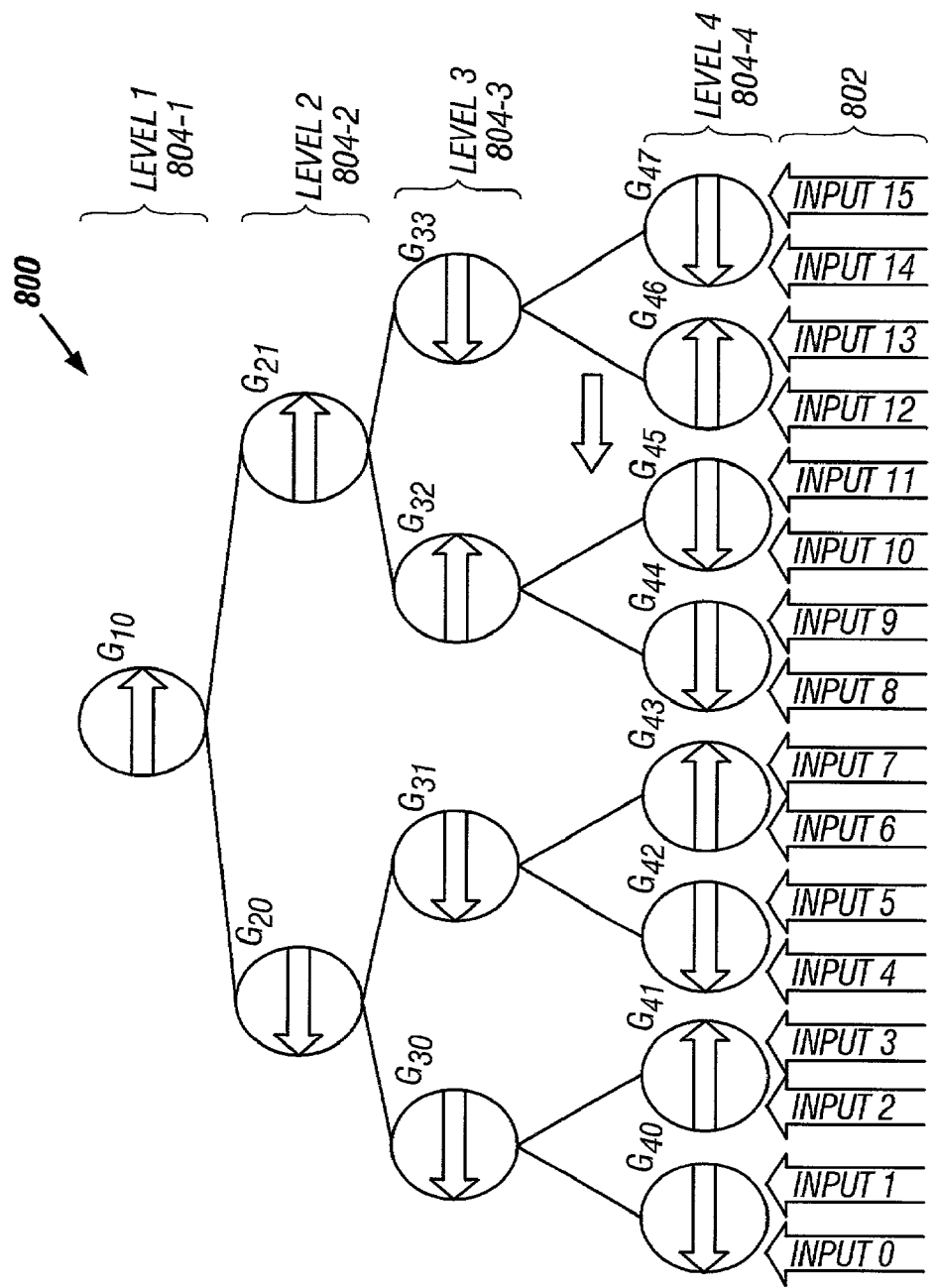
FIG. 8 depicts an exemplary 16-input binary tree arbiter (BTA) that can be implemented as an LTA in accordance with the teachings of the present invention.

FIG. 8 depicts an exemplary 16-input binary tree arbiter (BTA) 800 that can be implemented as an LTA in accordance with the teachings of the present invention. The BTA, which is a data structure associated with a selection mechanism, is arranged such that the tree nodes are binary (i.e., only two "children" per node). Each tree node is an arbiter (AR2) that is responsible for selecting between two entities. For an N×N switch, the binary tree will have k levels, wherein $k=\log_2[N]$. In the exemplary BTA depicted in FIG. 8, where N=16, four levels of binary arbiters are arranged in a tree, where reference numeral 804-4 refers to the leaf arbiter nodes, reference numeral 804-3 refers to Level 3 intermediate arbiter nodes, reference numeral 804-2 refers to Level 2 intermediate arbiter nodes, and reference numeral 804-1 refers to Level 1 root arbiter node.

In general, the tree arbiter nodes have various attributes, among which is a Boolean flag (which can illustrated as an arrow pointing in the left or right direction) that allows to select one of the two children. The leaves of the tree are connected to an input vector of 0's and 1's, representing the presence of control signals, i.e., inputs 802, from various contending units (e.g., the ingress or egress points of a switch). The selection mechanism which allows to select one of the two requests from each group (i.e., group size=2), is comprised of two phases: an upward propagation phase of requests and a downward propagation phase of grants. In the upward propagation phase, each parent node (starting from the lowest level) will pick one of its children according to its flag and propagate a request to its parent on the next higher level. If both children have requests, the arbiter node selects the one its flag points to. If only one child has a request, the arbiter node selects it irrespective of its flag. Further, if there are no requests to an arbiter node from its children, it propagates no requests to its own parent (i.e., the arbiter node above it to which it is coupled). As shown in the example of FIG. 8, between the requests of entity 1 (input 0) and entity 2 (input 1), the $G_{40}$ leaf arbiter associated therewith selects the request from entity 1 because the arrow flag points to the left. In similar fashion, between the requests of entity 3 (input 2) and entity 4 (input 3), the corresponding leaf arbiter ($G_{41}$) selects the request from entity 4. When these requests are propagated upward to the next level, the corresponding intermediary arbiter ($G_{30}$) node then selects the request from entity 1 because of its flag. The propagation of the requests continues until the final selection is made by the root arbiter $G_{10}$, whose choice is the start of the downward propagation. A node that was picked will update its flag such that the flag will point to the child other than the one it picked itself during the upward propagation. If the flag did not pick the child then the flag is not modified. At the end, only one leaf is selected, which selection is appropriately ANDed along the selection path. Below are the Boolean expressions for selecting any one of the 16 inputs as an arbitration pick:

Output 0 = $L(G_{40})$ AND $L(G_{30})$ AND $L(G_{20})$ AND $L(G_{10})$
Output 1 = $R(G_{40})$ AND $L(G_{30})$ AND $L(G_{20})$ AND $L(G_{10})$
Output 2 = $L(G_{41})$ AND $R(G_{30})$ AND $L(G_{20})$ AND $L(G_{10})$
Output 3 = $R(G_{41})$ AND $R(G_{30})$ AND $L(G_{20})$ AND $L(G_{10})$
Output 4 = $L(G_{42})$ AND $L(G_{31})$ AND $R(G_{20})$ AND $L(G_{10})$
Output 5 = $R(G_{42})$ AND $L(G_{31})$ AND $R(G_{20})$ AND $L(G_{10})$
Output 6 = $L(G_{43})$ AND $R(G_{31})$ AND $R(G_{20})$ AND $L(G_{10})$
Output 7 = $R(G_{43})$ AND $R(G_{31})$ AND $R(G_{20})$ AND $L(G_{10})$
Output 8 = $L(G_{44})$ AND $L(G_{32})$ AND $L(G_{21})$ AND $R(G_{10})$
Output 9 = $R(G_{44})$ AND $L(G_{32})$ AND $L(G_{21})$ AND $R(G_{10})$
Output 10 = $L(G_{45})$ AND $R(G_{32})$ AND $L(G_{21})$ AND $R(G_{10})$
Output 11 = $R(G_{45})$ AND $R(G_{32})$ AND $L(G_{21})$ AND $R(G_{10})$
Output 12 = $L(G_{46})$ AND $L(G_{33})$ AND $R(G_{21})$ AND $R(G_{10})$
Output 13 = $R(G_{46})$ AND $L(G_{33})$ AND $R(G_{21})$ AND $R(G_{10})$
Output 14 = $L(G_{47})$ AND $R(G_{33})$ AND $R(G_{21})$ AND $R(G_{10})$
Output 15 = $R(G_{47})$ AND $R(G_{33})$ AND $R(G_{21})$ AND $R(G_{10})$ Where the BTA is employed on the egress side (i.e., as a grant arbiter), the flags in each two-input AR2 arbiter may be updated after each arbitration. The flags can be modified so as to reflect the present grant. However, if the grant is not accepted, the modified flags can be reverted to the past iteration's state or be left as if the grant has been accepted. These two options for the output BTAs can be termed as "reverting" and "non-reverting" options, respectively. Additional details concerning the implementational variations of BTAs in the context of a multiserver scheduling mechanism may be found in the above-referenced commonly owned co-pending patent application, application Ser. No. 10/059, 641, filed Jan. 28, 2002, which has been incorporated by reference.

With respect to implementing the BTA architecture in a LUT-based scheme, the flags of the nodal arbiters form the present state information and are used for arbitration in the subsequent arbitrations as set forth hereinabove. For any given set of non-zero inputs, the sequence of picks is deterministic and follows a pattern depending on the inputs. Thus, the fields of the LUT structure are accordingly populated with the pre-computed arbitrations results as per the input/state combinations. A specific example of a BTA-based LUT will be provided below for a 4-input arbiter.

As has been explained in the foregoing discussion, an LTA can essentially be formalized as a simple storage unit with "data" stored at different "addresses" wherein, depending on the value of the address, a particular data value may be randomly accessed. Thus, the LTA implementation may be realized on any suitable fast data retrieval device. Whereas the prior state information may be stored in separate registers which can be fed back as part of the address, such state information can also be stored in the same data retrieval device.

With respect to the RRA and BTA implementations, several observations can be made that are constructive with respect to the making and using of their LTA-based formulations. First, both RRAs and BTAs arbitrate between inputs that are active (i.e., have a current control signal, the presence of which can be encoded in a binary form, e.g., 1 or 0). The RRA and BTA persistent states are updated differently, however. Whereas all the flags in a BTA can be seen as a memory-based representation of the N previous picks (where N is the number of competing entities), the RRA pointer represents only the last pick. Accordingly, the size required to store the state information of a BTA is N-1 bits (one bit for each flag), while the RRA's pointer requires log[N] bits (multiplexed number of the last pick). Further, since both RRAs and BTAs return a pick of one input among N, only one output will be 1 and the rest will be 0's. The stored arbitration results in the LTA formulations will therefore have to be decoded appropriately.

Hardware storage requirements for the LTA-based implementations of RRA and BTA schemes can be assessed in light of the above observations. Only log[N] bits are required for storing the RRA pointer, since the outputs can be demultiplexed to get the 1 at the right bit location of the encoded result. The input address of a LUT may be provided as a concatenation of the state information and the present input (which encodes the presence of control signals generated by the competing entities).

With particular reference to the RRA scheme, since the pointer can be coded in log[N] bits and the present input is N bits (because of N entities), the width of the address information associated with the LUT is N+log[N]. The number of rows in the table can be readily seen as $2^{N-log[N]}$ (all possible combinations of inputs and state information). Each row contains a pick field of log[N] bits that corresponds to the particular input/state combination associated therewith. The total number of bits of an RRA-based LUT will therefore work out to be $\{Log[N]\}2^{N+log[N]}$. It should be further observed that the RRA's pick can be re-used in the feedback to compute the state information (i.e., the pointer) by simply incrementing the pick value. Because of the circularity, Modulo N will be used. Also, any other scheme that is similar to RRA but of another sequence (any permutation of the canonical numerical order of the contending entities) can be simulated using an LTA of the same size.

To fully simulate a BTA using an LTA-based implementation, the required address width is 2N-1, since N-1 bits instead of log[N] are needed for the state information (i.e., BTA flags), plus N bits needed for the N entities with inputs. The contents of a row can include not only the pick value (requiring log[N] bits) but also the new state of the flags (requiring N-1 bits), since the new state cannot be computed using the pick or the current state itself. The total number of bits of a BTA-based LUT will therefore work out to be $\{(N-1)+Log[N]\}2^{[2N-1]}$.

FIGS. 9A and 9B are two tables illustrating the various storage parameters associated with LUT-based RRA and BTA implementations for a select number of inputs. Table 900A provides storage comparisons with respect to an RRA-based LUT for N=4, 8, 16, 32 and 64. Similarly, table 900B provides the comparisons for a BTA-based LUT implementation for N=4, 8, 16, 32 and 64. Although the tables indicate that the LUT-based scheme is rather prohibitive for large size arbiters, it should be appreciated that most switch sizes are not big and typically involve 16×16 matrix. A LUT having 512 KB is sufficient to represent a 16-input RRA. As to an 8-input BTA, a LUT of only 60 KB is required.

FIGS. 10A and 10B depict a LUT 1000 for a 4-input RRA rendition in accordance with the teachings of the present invention. Address information 1002 for the RRA-based LUT 1000 is comprised of encoded input information 1006 and encoded state (i.e., pointer) information 1008. As there are four contending entities, four bits B3 through B0 are used in order for encoding. For example, [0110] means that B2 and B1 have an arbitration control signal (e.g., a request) while B3 and B0 are inactive and thus do not have any arbitration control signals. As a further example, [1000] means that only B3 has a control signal. The state information 1008 is encoded with a 2-bit field, representing one of four entities, B0 through B3. B3 is encoded as [11], B2 is encoded as [10], and similarly, B1 is [01] an B0 is [00] For instance, [01] means that the pointer points to B1 (i.e., the currently favored entity is B1).

Arbitration result information 1004 of the LUT 1000 is comprised of a pick field 1010. Although a separate new state field 1012 is shown, it is provided for illustration only, since a new state can be readily computed from the current pick value (thus obviating the need for independent storage). The 2-bit pick field 1010 is encoded to represent the four entities (B3 through B0) similar to the representation of the state. That is, [00], [01], [10], and [11] represent B0, B1, B2 and B3, respectively. Where "XX" is shown in the table, it means that no entity is picked (e.g., because there were no requests). In one implementation, an arbitration result of XX may leave the output to be either same as before, or unknown, or undefined.

In accordance with the RRA methodology, after a pick, the new state value is the incremented pick value, Modulo [N]. If there was no selection, the new state is the same as the old state. By way of exemplary operation of the LUT 1000, reference numeral 1014 refers to a row that is used when the control signals are from B0 and B2 and the state is B1. The input is encoded as [0101] (for B2 and B0) and the state is [01] (for B1). The corresponding address field (input field concatenated with the state field) comprises [010101]. The corresponding pick on row 1014 associated with the address [010101] is [10], which is decoded as B2. Thus, B2's request is granted and the new state is incremented to [11], which is B3.

Referring now to FIGS. 11A–11C, shown therein is an exemplary LUT 1100 for a 4-input BTA rendition in accordance with the teachings of the present invention. Again, address information 1102 associated with the BTA-based LUT 1100 is comprised of an input field 1106 and a state field 1108. The input field 1106 is encoded to represent the four entities B3 through B0. The BTA flags are coded as follows: 0 for left and 1 for right. The following convention is used for flag reversion: a flag is flipped if it was in the selection path and if it selected the final pick. The state field 1108 is encoded with a 3-bit field for the three flags F2 through F0, as there are 3 AR2 nodes in the tree where F0 and F1 are the leaf arbiters and F2 is the root arbiter. The tree is arranged such that F1 takes the inputs B3 and B2, and F0 takes the inputs from B1 and B0. F2, the root arbiter, arbitrates between inputs generated by F1 and F0.

Arbitration result field 1104 of the LUT 1100 is comprised of a 2-bit pick field 1110 for uniquely identifying the four entities, B3 through B0, as before. The updated state is encoded in a 3-bit new state field 1112 as part of the result field.

By way of illustrative operation, consider row 1114 of the table 1100. Entities B3, B2 and B0 have requests whereas B1 is inactive. The input field of row 1114 is thus encoded as [1101]. Assume that the three flags are as follows: F2 points to the right, and F1 and F0 to the left. The state field is thus represented as [100]. In accordance with the BTA mechanism, F0 picks B0 although it points to B1 (but B1 is not requested). F1 picks B3 and the F2 picks the choice of F0. Accordingly, B0 is ultimately picked along the path {F2, F1}. Using the flag reversion convention, F2 is flipped because it was in the path and it favored the pick. F1 is not changed because it was not on the selection path. On the other hand, F is not flipped even though it was in the path, because it did not favor the pick. The pick field of row 1114 accordingly contains [00] which corresponds to the selected entity B0. The new state field contains [000], which is the encoded formulation for the three flags now pointing to the left.

FIG. 12 is an exemplary LUT 1200 for a 4-input fixed priority arbiter rendered in accordance with the teachings of the present invention wherein there is no state information. As a result, address field 1202 is comprised only of a 4-bit encoded input field 1206. Similarly, arbitration result field 1204 includes only a pick field 1208 that is encoded using a 2-bit field. Once again, the four entities are coded in the input field in the following order [B3:B2:B1:B0]. The selection logic of the fixed priority arbiter is as follows: always B0 if requested, else B1 if requested, else B2 if requested, else B3 if requested. Thus, assuming a full complement of requests, the priority is: B0>B1>B2>B3. Row 1210 exemplifies the situation where B3, B1 and B0 have requests while B2 is inactive (encodes as [1011]). Because of the fixed priority, B0 is selected as the pick regardless of the other requests. Thus, for any input field of [XXX1], the pick field should be [00], as is the case with the LUT 1200.

Based upon the foregoing Detailed Description, it should be apparent that the present invention advantageously provides an innovative LUT-based arbitration scheme that is suitable for application in tomorrow's high-speed networks where the transmission speeds are poised to overtake the nodal switching capacities. Since different arbiter arrangements and architectures can be emulated effectively in the LTA methodology of the present invention, multiserver-capable scheduler algorithms—which generally require advanced arbiter mechanisms—can be implemented in a cost-effective manner in high performance switches.

Those skilled in the art should recognize that the present invention is amenable to several implementational considerations and variations. For instance, there may be a performance versus implementation cost factor in instrumenting "real" arbiter behavior in a LUT. The authentic simulation of a real arbiter can be viewed as adding to the performance of the arbitration since it is assumed that the real arbiter may have certain predefined characteristics and properties that are beneficial for the arbitration. While a degenerative form of a real arbiter in terms of its arbitration characteristics and behavior could lead to a reduced performance of the implemented arbiter, it could still be desirable from the implementation point of view because of the savings in the chip area required for the LUT size. Further, a LUT-implemented arbiter may be adequate when its performance is compared against that of the real arbiter it is based on, especially with respect to the overall network system's goals and objectives which may not be impacted in any measurable terms.

Additionally, the LUT-based implementation may not necessarily be based on any real known hardware arbiter implementation. Any known or heretofore unknown abstract concept of an arbiter could be advantageously implemented using an appropriate storage-based scheme in accordance with the teachings of the present invention. In terms of performance of the network system and the implementation cost of the storage structure (e.g., a LUT), it might be even better to base the simulated arbiter on an abstract concept of an arbiter. It can be particularly attractive with respect to the cost of the LUT implementation if the arbitration performance is on par with that of any other known schemes such as BTA, BRA, et cetera, in a network system.

It was already shown how the size of a LUT storage structure is affected by the number of inputs per arbiter. One way of reducing the requisite size is to fold the table since a tabular data structure resulting from arbiter simulation in the context of a switch fabric tends to be symmetric in its inputs, outputs, and state information. Such a folding technique is particularly amenable to the BTA and BRA schemes described in greater detail hereinabove. Essentially, the technique lies in flipping or modifying the inputs of the LUT in such a way that a significant portion of the LUT (e.g., half) is a mirror copy of a corresponding portion thereof. Likewise, the states could be transformed or retransformed to obtain the requisite mirroring.

As shown hereinbefore, implementing the RGA or RG arbitration scheme requires multiple arbiters for performing Request, Grant and Accept arbitrations. Whereas it is possible to have a separate LUT implemented for each of the needed arbiters in order to maximize the arbitration speed, it may be space-prohibitive as well as cost-prohibitive. A solution that can adequately compromise the space versus arbitration time is to implement a single LUT for a subset or whole set of the arbiters needed. In such a scheme, the requests to the different arbiters can be serialized or pipelined per a given time slot such that the arbitrations are made in a time period which is more than a single arbiter's arbitration time but less than the total amount required for all individual arbitrations. The states of each of the simulated arbiter can be stored appropriately in registers so as to "personalize" the LUT with respect to each of the required arbiters. While such an implementation saves the chip area, the arbitration speed may be somewhat reduced, however.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. An arbitration system for a network switch element, comprising:

an encoder for encoding a plurality of inputs into address information associated with a storage structure, said inputs corresponding to control signals generated by a plurality of entities associated with a cross-connect matrix of said network switch element, wherein said entities are operable to establish a set of connections through said cross-connect matrix for transporting data from said network switch element's ingress side to its egress side;

said storage structure including a plurality of fields for storing pre-computed arbitration results based on a select arbiter scheme employed in a particular scheduling mechanism for transporting said data, wherein each arbitration result corresponds to at least a particular input combination; and a decoder for decoding a selected arbitration result into an identity associated with a corresponding entity.

2. The arbitration system for a network switch element as set forth in claim 1, wherein said storage structure comprises a look-up table.

3. The arbitration system for a network switch element as set forth in claim 1, wherein said storage structure is realized in a read-only memory (ROM).

4. The arbitration system for a network switch element as set forth in claim 1, wherein said storage structure is realized in an electrically programmable read-only memory (EPROM).

5. The arbitration system for a network switch element as set forth in claim 1, wherein said storage structure is realized in a dynamic random access memory (DRAM).

6. The arbitration system for a network switch element as set forth in claim 1, wherein said storage structure is realized in a static random access memory (SRAM).

7. The arbitration system for a network switch element as set forth in claim 1, wherein said storage structure is realized in a Flash memory.

8. The arbitration system for a network switch element as set forth in claim 1, wherein said storage structure is realized in a field-programmable gate array (FPGA).

9. The arbitration system for a network switch element as set forth in claim 1, wherein said storage structure is realized in a application-specific integrated circuit (ASIC).

10. The arbitration system for a network switch element as set forth in claim 1, wherein said select arbiter scheme includes at least one flexible ring arbiter.

11. The arbitration system for a network switch element as set forth in claim 1, wherein said select arbiter scheme includes at least one binary tree arbiter (BTA).

12. The arbitration system for a network switch element as set forth in claim 1, wherein said select arbiter scheme includes at least one round-robin arbiter (RRA).

13. The arbitration system for a network switch element as set forth in claim 1, wherein said select arbiter scheme includes at least one fixed priority arbiter.

14. The arbitration system for a network switch element as set forth in claim 1, wherein said select arbiter scheme is implemented at said network switch element's ingress side.

15. The arbitration system for a network switch element as set forth in claim 1, wherein said select arbiter scheme is implemented at said network switch element's egress side.

16. The arbitration system for a network switch element as set forth in claim 1, wherein said arbiter scheme is implemented as at least one of a request arbiter, a grant arbiter and an accept arbiter.

17. The arbitration system for a network switch element as set forth in claim 1, wherein said arbiter scheme is implemented as part of a Request-Grant-Accept (RGA) iteration strategy associated with said particular scheduling mechanism.

18. The arbitration system for a network switch element as set forth in claim 1, wherein said arbiter scheme is implemented as part of a Request-Grant (RG) iteration strategy associated with said particular scheduling mechanism.

19. The arbitration system for a network switch element as set forth in claim 1, wherein said encoder is operable to encode prior state information associated with select arbiter scheme into a portion of said address information, wherein said prior state information is operable to be updated by said select arbiter scheme in a predetermined manner.

20. An arbitration methodology for a network switch element, comprising the steps:

encoding a plurality of inputs into address information associated with a storage structure, said inputs corresponding to control signals generated by a plurality of entities associated with a cross-connect matrix of said network switch element, wherein said entities are operable to establish a set of connections through said cross-connect matrix for transporting data from said network switch element's ingress side to its egress side;

storing pre-computed arbitration results in a plurality of fields associated with said storage structure, wherein said arbitration results are based on a select arbiter scheme employed in a particular scheduling mechanism for transporting said data, each arbitration result corresponding to at least a particular input combination;

responsive to a particular input combination in an arbitration iteration, obtaining a selected arbitration result from said storage structure; and decoding said selected arbitration result into an identity associated with a corresponding selected entity for said arbitration iteration.

21. The arbitration methodology for a network switch element as set forth in claim 20, further comprising the steps:

updating prior state information associated with said select arbiter scheme in a predetermined manner based on said arbitration result obtained in an arbitration iteration; and utilizing said updated state information as at least a portion of said address information for a next arbitration iteration.

22. The arbitration methodology for a network switch element as set forth in claim 20, wherein said pre-computed arbitration results are stored in a look-up table (LUT).

23. The arbitration methodology for a network switch element as set forth in claim 20, wherein said pre-computed arbitration results are stored in a storage structure selected from the group consisting of a read-only memory (ROM) structure, an electrically programmable read-only memory (EPROM) structure, a dynamic random access memory (DRAM) structure, a static random access memory (SRAM) structure, a Flash memory structure, a field-programmable gate array (FPGA) and an application-specific integrated circuit (ASIC).

24. The arbitration methodology for a network switch element as set forth in claim 20, wherein said select arbiter scheme includes at least one flexible ring arbiter.

25. The arbitration methodology for a network switch element as set forth in claim 20, wherein said select arbiter scheme includes at least one binary tree arbiter (BTA).

26. The arbitration methodology for a network switch element as set forth in claim 20, wherein said select arbiter scheme includes at least one round-robin arbiter (RRA).

27. The arbitration methodology for a network switch element as set forth in claim 20, wherein said select arbiter scheme includes at least one fixed priority arbiter.

28. The arbitration methodology for a network switch element as set forth in claim 20, wherein said select arbiter scheme is implemented at said network switch element's ingress side.

29. The arbitration methodology for a network switch element as set forth in claim 20, wherein said select arbiter scheme is implemented at said network switch element's egress side.

30. The arbitration methodology for a network switch element as set forth in claim 20, wherein said arbiter scheme is implemented as at least one of a request arbiter, a grant arbiter and an accept arbiter.

31. The arbitration methodology for a network switch element as set forth in claim 20, wherein said arbiter scheme is implemented as part of a Request-Grant-Accept (RGA) iteration strategy associated with said particular scheduling mechanism.

32. The arbitration methodology for a network switch element as set forth in claim 20, wherein said arbiter scheme is implemented as part of a Request-Grant (RG) iteration strategy associated with said particular scheduling mechanism.

* * * * *